Figure 1:
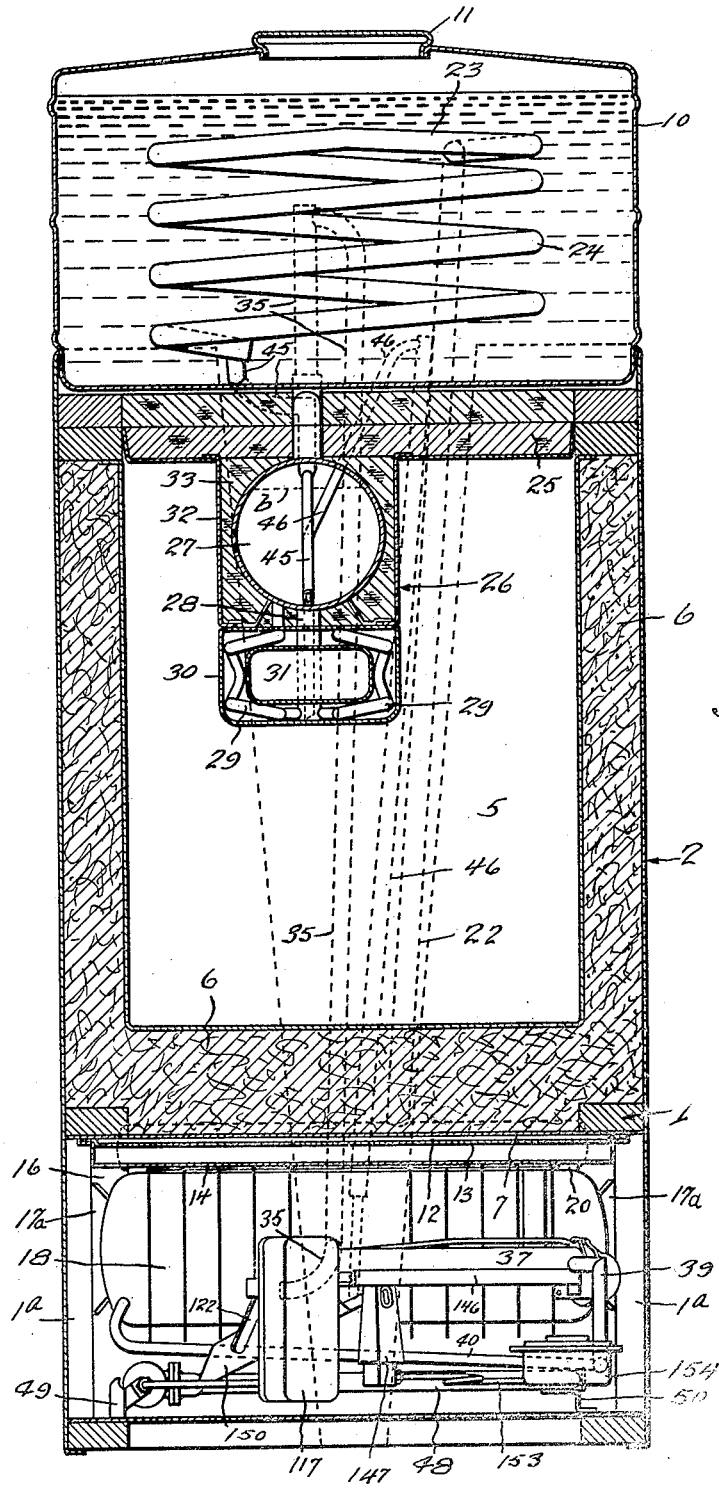

Feb. 6, 1934.  W. G. MIDNIGHT  1,946,029
REFRIGERATION APPARATUS
Filed Aug. 22, 1931   9 Sheets-Sheet 1

Inventor
Wilbur G. Midnight
By
Attorneys

Feb. 6, 1934.   W. G. MIDNIGHT   1,946,029
REFRIGERATION APPARATUS
Filed Aug. 22, 1931   9 Sheets-Sheet 4

Inventor
Wilbur G. Midnight
Hull, Brock & West
Attorneys

Feb. 6, 1934.  W. G. MIDNIGHT  1,946,029
REFRIGERATION APPARATUS
Filed Aug. 22, 1931   9 Sheets-Sheet 5

Inventor
Wilber G. Midnight
By Hull, Brock & West
Attorneys

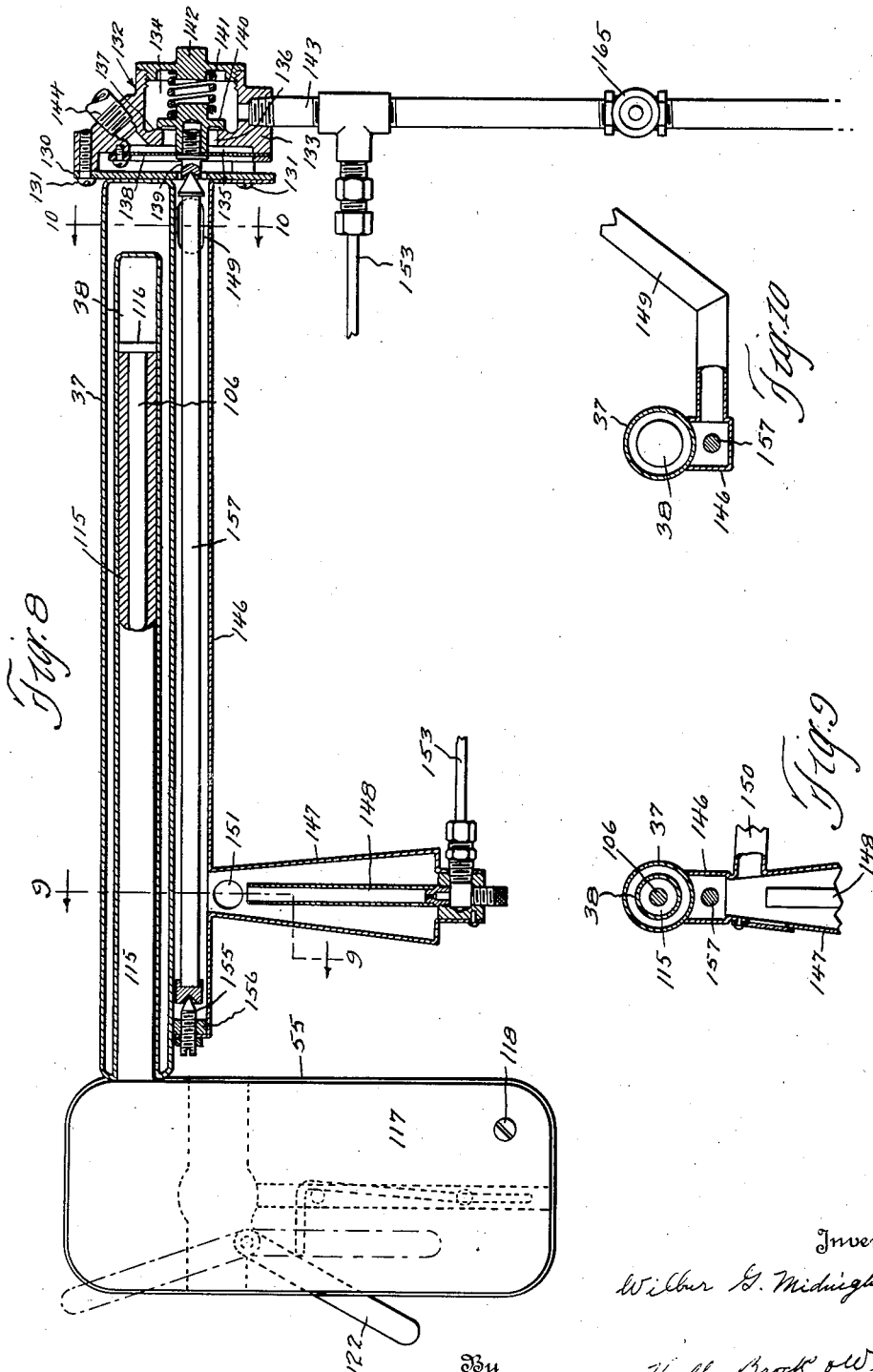

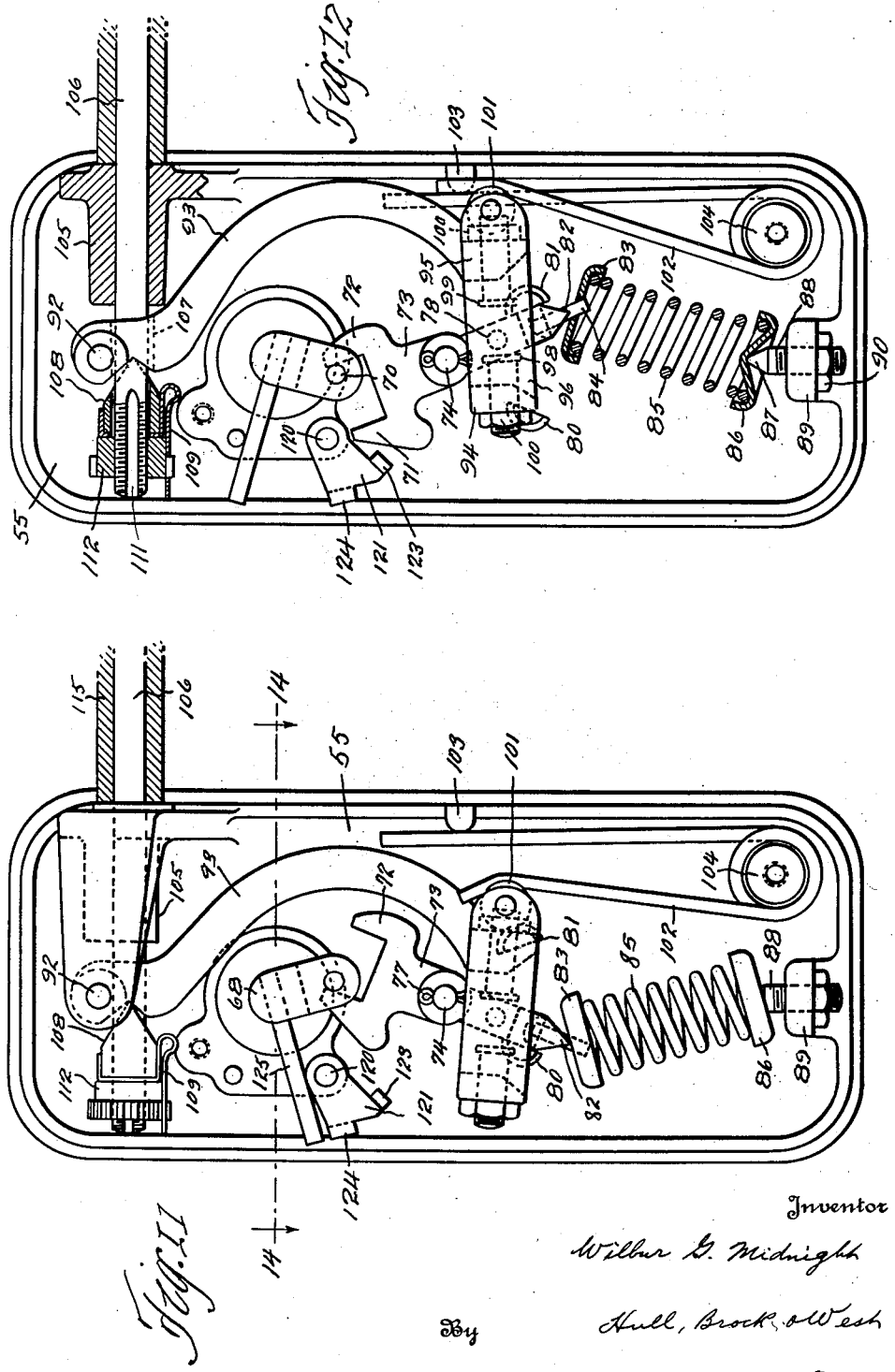

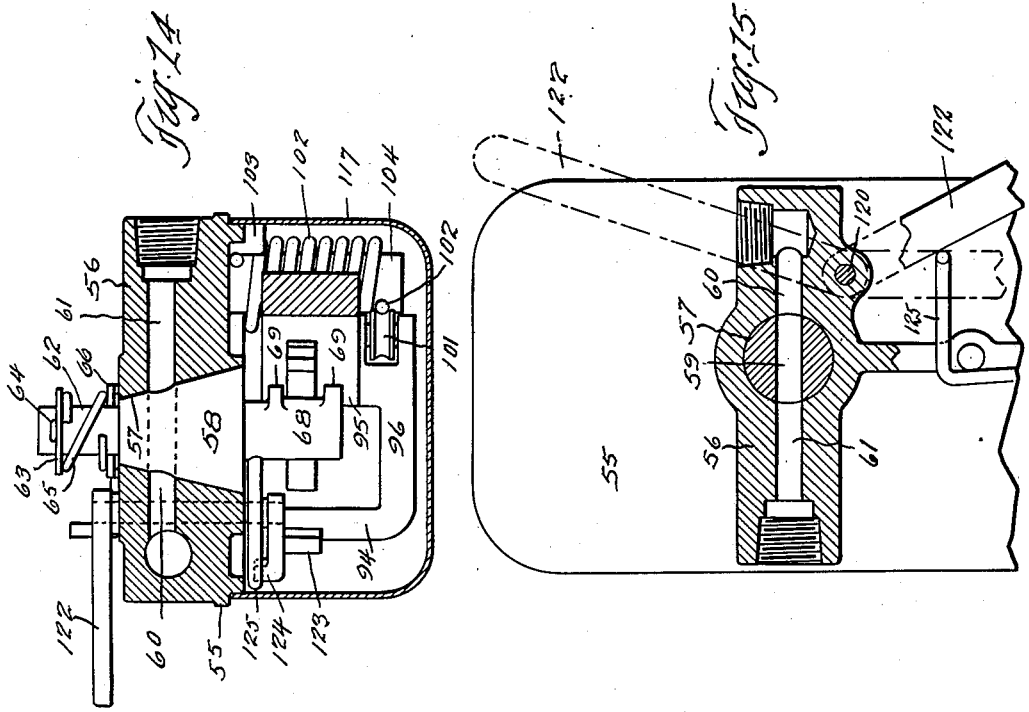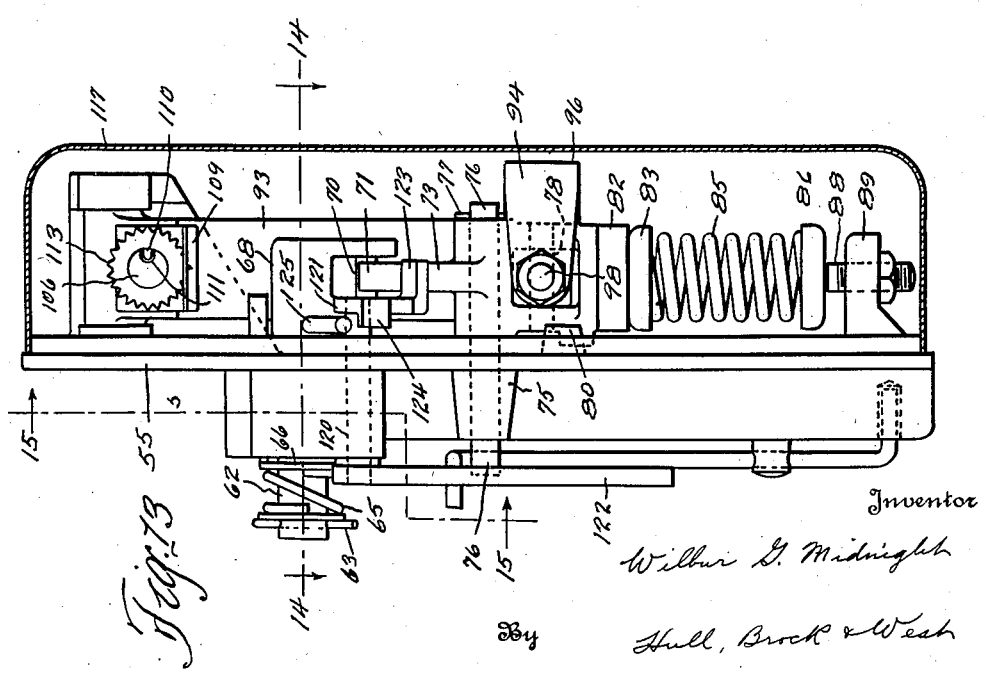

Feb. 6, 1934.  W. G. MIDNIGHT  1,946,029
REFRIGERATION APPARATUS
Filed Aug. 22, 1931  9 Sheets-Sheet 9
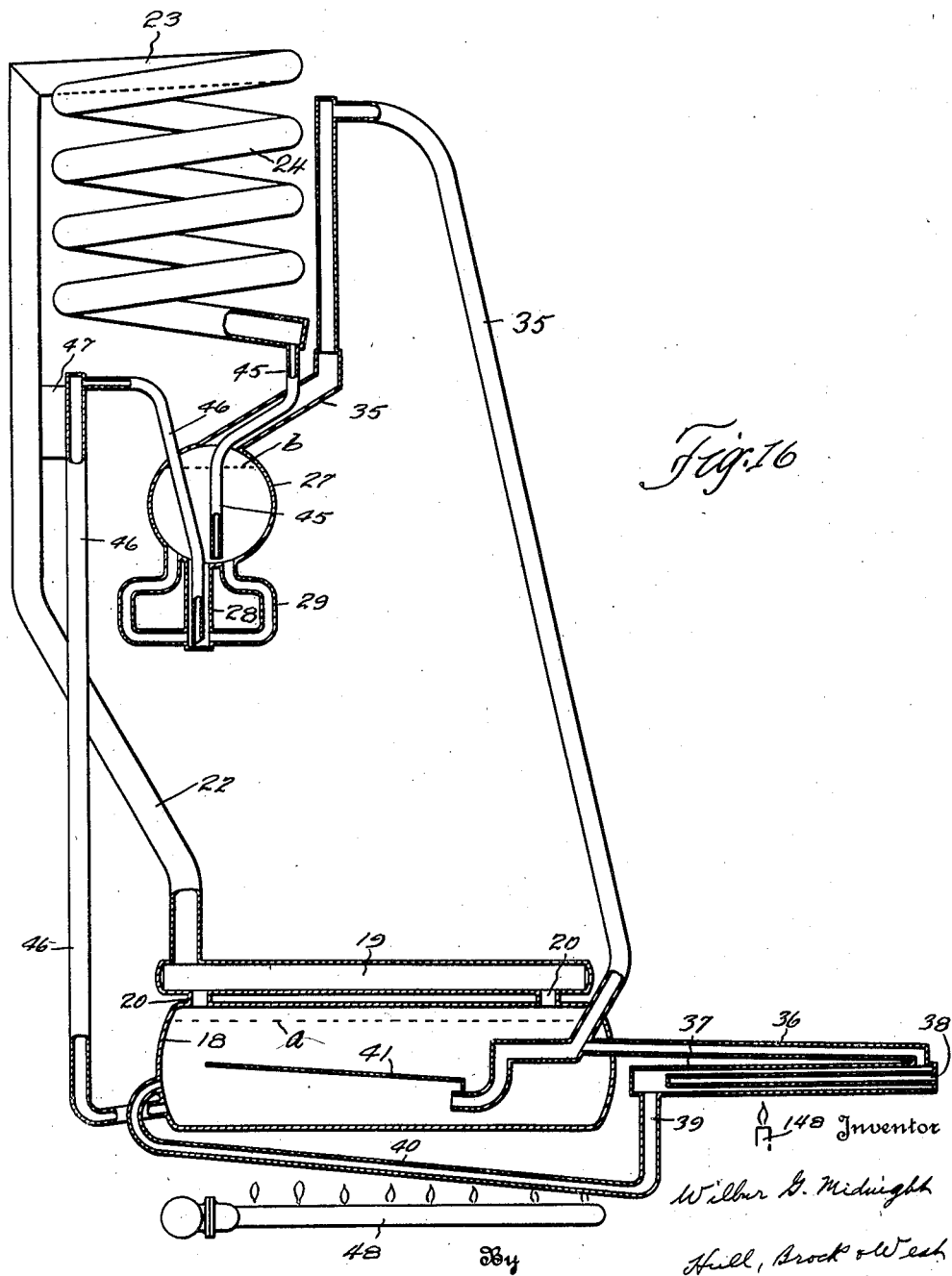
Inventor
Wilbur G. Midnight
By Hull, Brock & West
Attorneys Patented Feb. 6, 1934

1,946,029

UNITED STATES PATENT OFFICE 1,946,029

REFRIGERATION APPARATUS

Wilbur G. Midnight, Cleveland, Ohio, assignor to Perfection Stove Company, Cleveland, Ohio, a corporation of Ohio Application August 22, 1931. Serial No. 558,747

17 Claims. (Cl. 62—5)

This invention pertains to absorption refrigeration apparatus and more particularly to an automatic control therefor, and it has for its primary purpose the provision of relatively simple yet highly efficient and thoroughly reliable means for shutting off the heat when the contents of the generator-absorber reaches a predetermined high temperature (during the attainment of which the required amount of refrigerant is distilled over into the receiver-evaporator) and for turning on the heat when the refrigerant is practically exhausted from the receiver-evaporator.

The invention had its conception in connection with gas fired absorption refrigerating machines and is so disclosed herein, although, in its broader aspect, the invention is not limited to use with such machines. A further object, however, in connection with gas fired machines, is to provide a thermostatically controlled safety valve that is maintained open by the heat of the pilot light wherefore should said light become extinguished the supply of gas to the main burner will be automatically shut off.

Another object of the invention is to provide a compact and symmetrical construction for artificial refrigerators of the class to which the invention pertains, and one which is convenient of use because of the accessibility of the various parts thereof. The refrigeration space, for example, is situated a convenient distance above the floor; the compartment housing the generator, burners, and control mechanism is located below said space and opens through the front of the cabinet, and the condenser surmounts the structure, all of said parts being in vertical alignment.

Another object of the invention is to provide means in the nature of air spaces and flues for effectively insulating the refrigeration space from the heat generated by the burners and that radiating from certain of the vessels and conduits, notwithstanding the proximity of said parts to said space.

Other objects and advantages will appear as I proceed to describe the invention in detail by reference to the accompanying drawings wherein the present preferred embodiment is illustrated.

Figure 2:
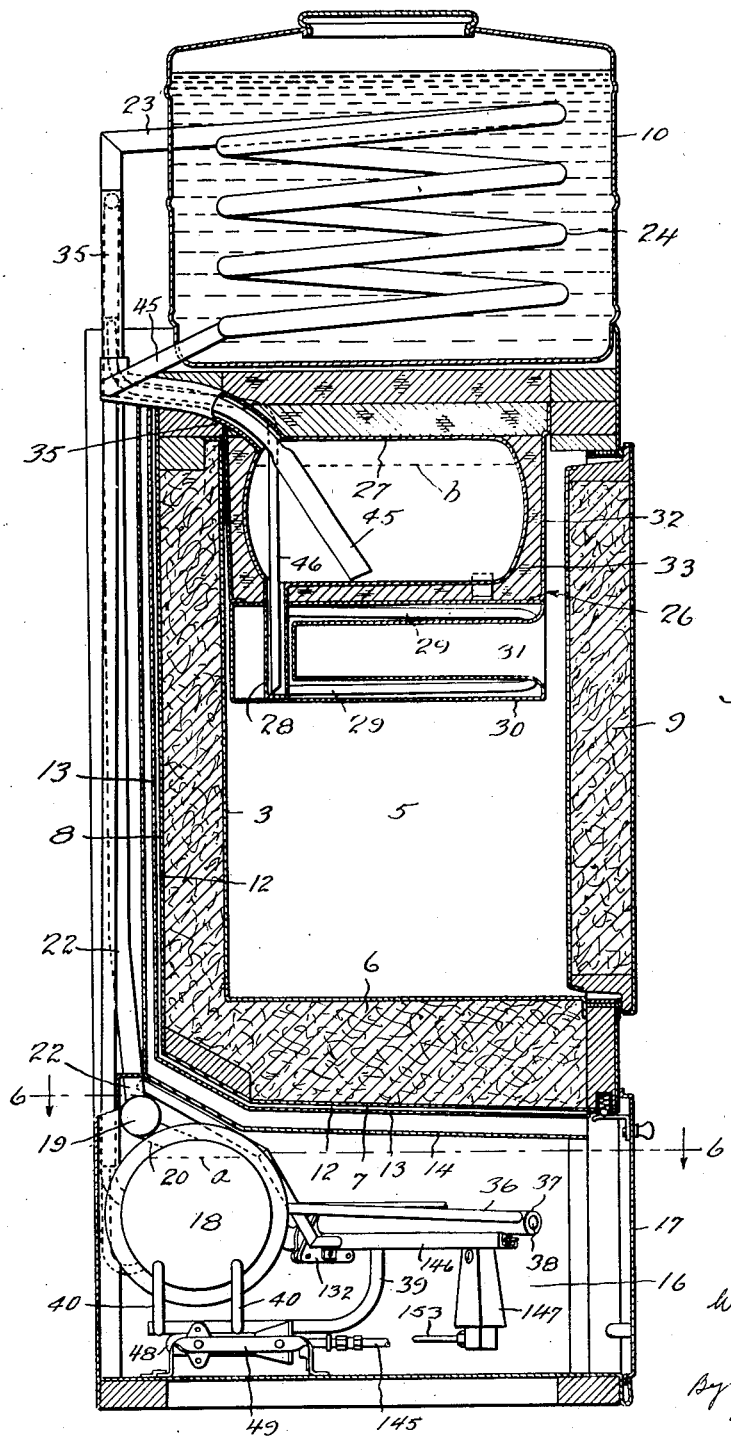
Figure 3:
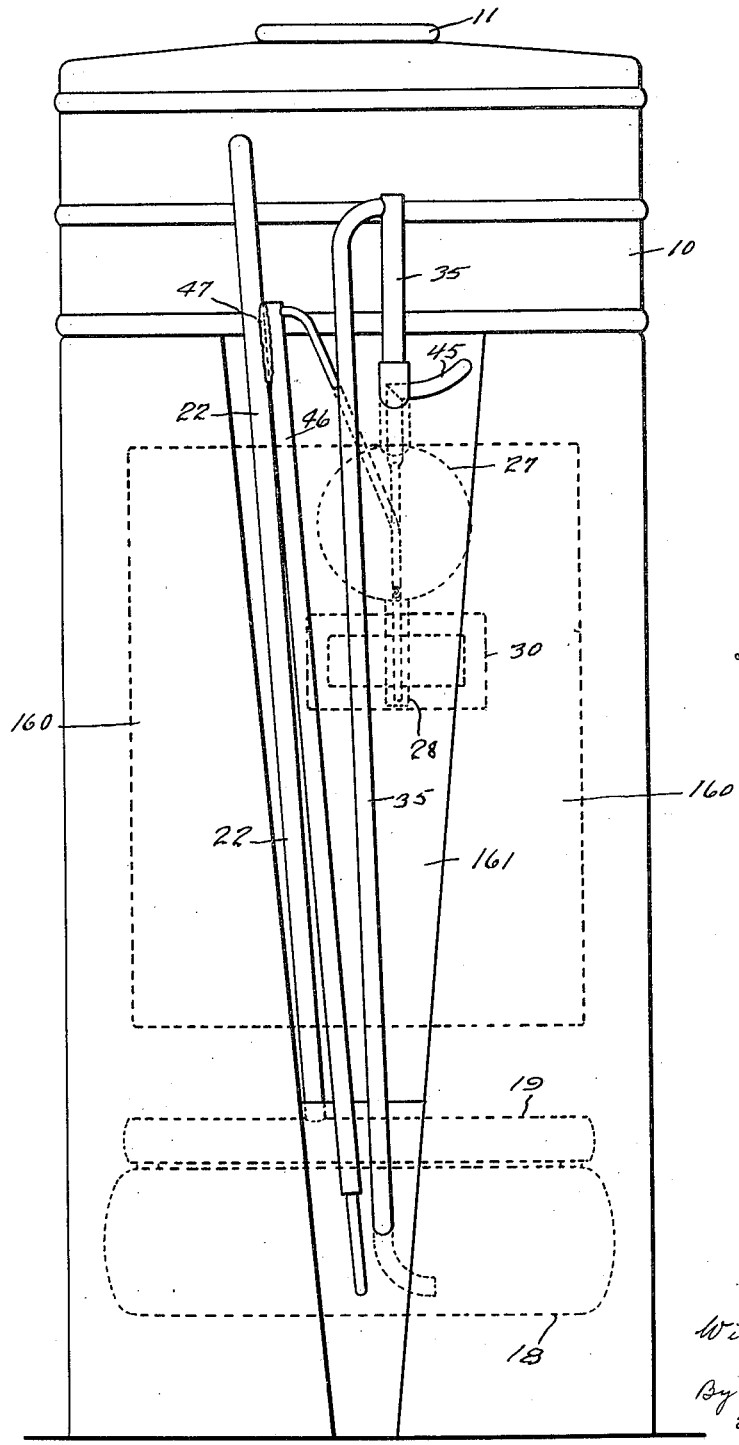
Figure 4:
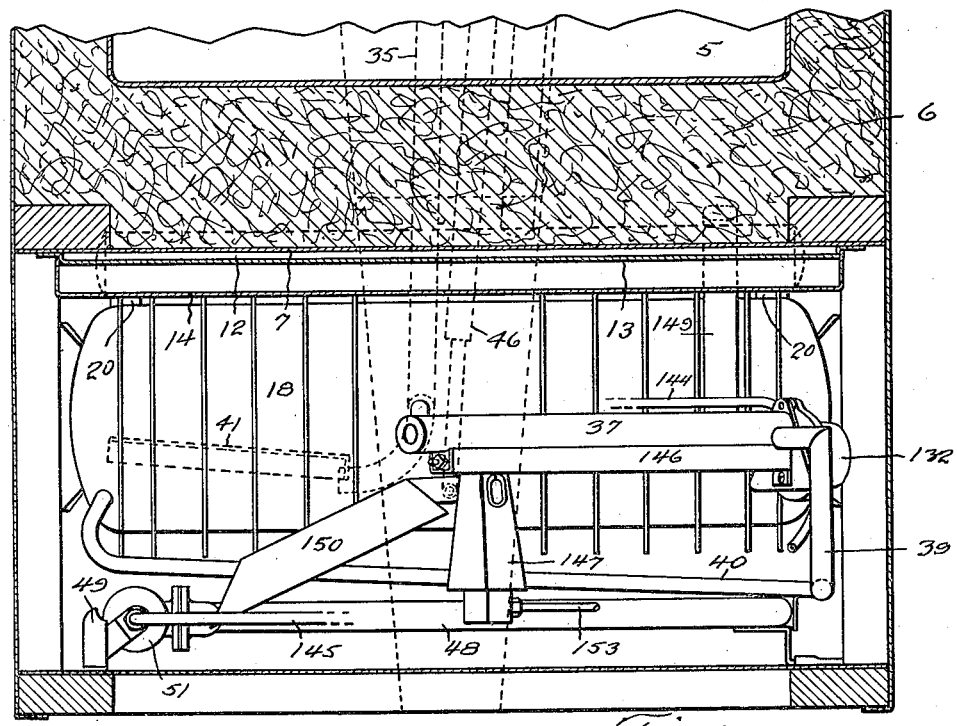
Figure 5:
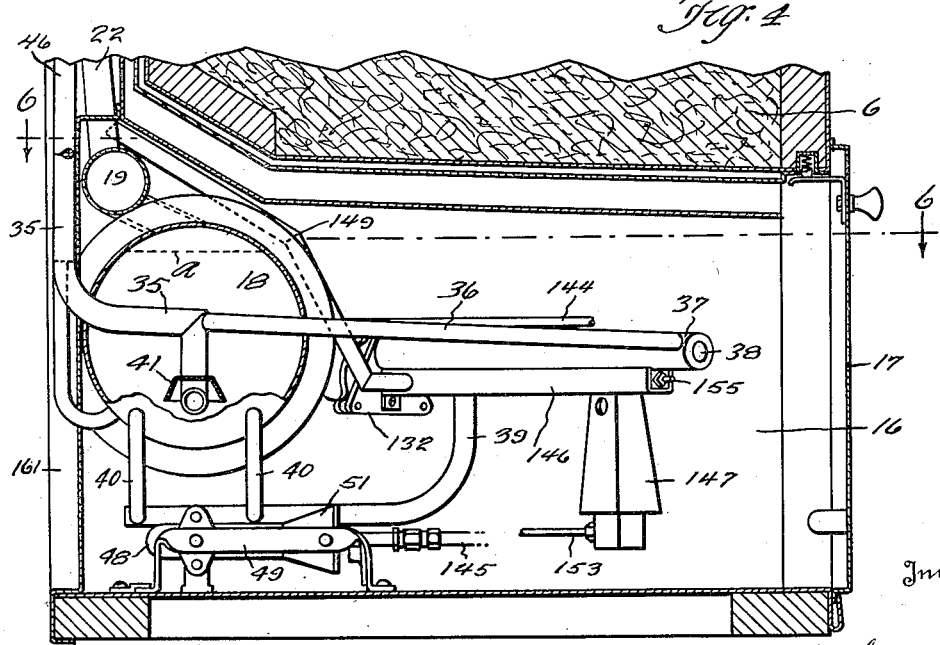
Figure 6:
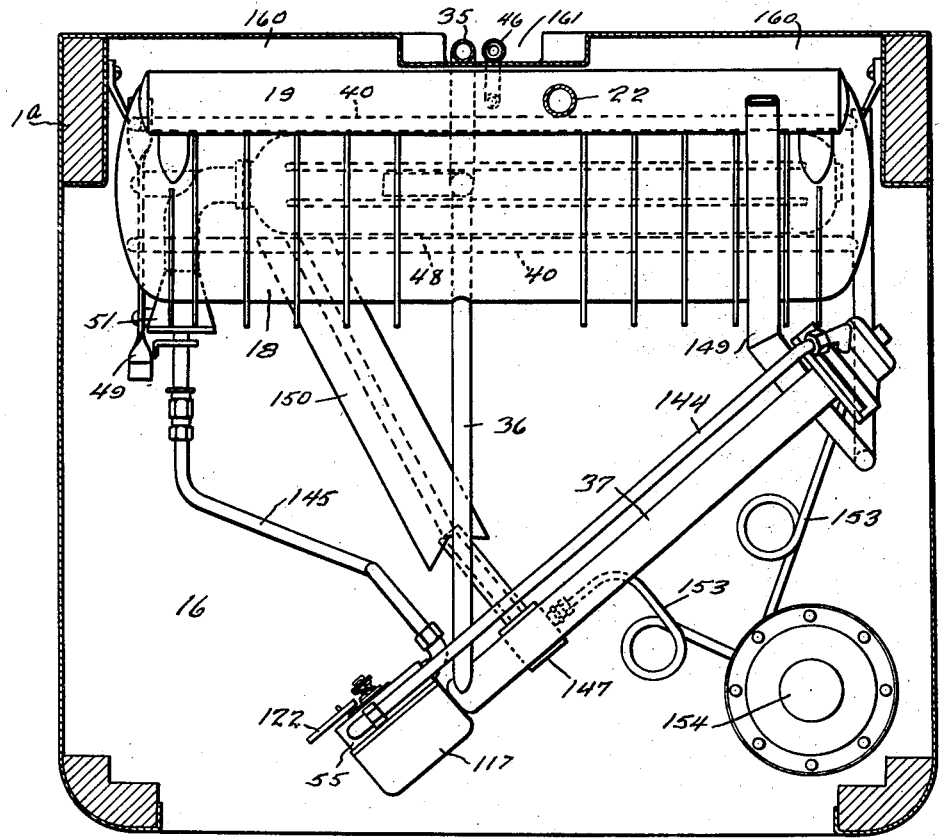
Figure 7:
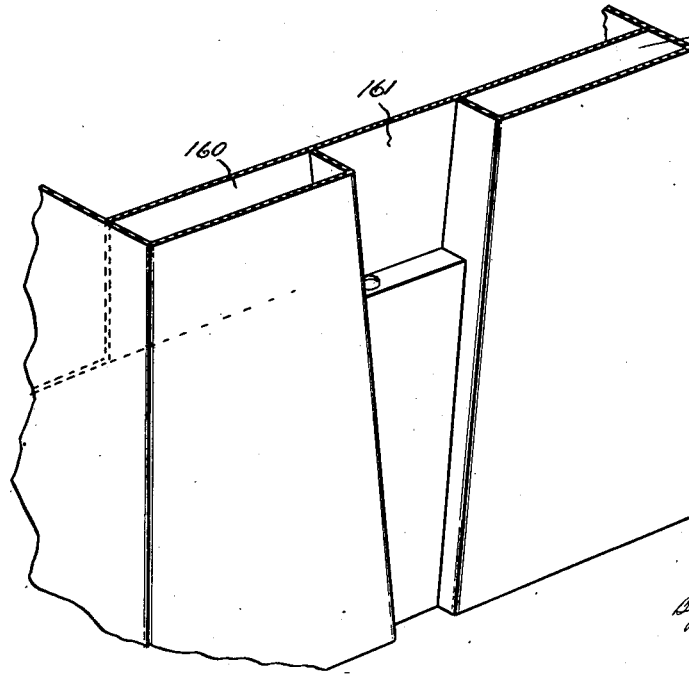

In the drawings Fig. 1 is a sectional front elevation, Fig. 2 a sectional side elevation, and Fig. 3 a rear elevation of an absorption refrigerating machine incorporating my improvements; Fig. 4 is a sectional front elevation of the lower portion of the machine on a scale somewhat enlarged over that of the preceding views, and from which a part of the control mechanism is omitted for clearness; Fig. 5 is a section from front to rear of the part of the machine illustrated in Fig. 4; Fig. 6 is a sectional plan substantially on the line 6—6 of Fig. 5; Fig. 7 is a detail in perspective of the double flue construction located on the rear side of the machine; Fig. 8 is a longitudinal section through the double wall receptacle, containing a thermostatic well, and the parts associated therewith including the safety valve, pilot burner, and the thermostat by which the former is controlled by the heat of the latter, the view including the main valve and its actuating mechanism in front elevation; Figs. 9 and 10 are sectional details on the respective lines 9—9 and 10—10 of Fig. 8; Figs. 11 and 12 are front elevational views, with the casing removed, of the main valve control mechanism, the respective views showing said mechanism in the positions it occupies when the valve is open and closed; Fig. 13 is a left hand side elevation of the main valve and its control mechanism, the casing enclosing the latter being shown in section; Figs. 14 and 15 are sections on the respective lines 14—14 and 15—15 of Fig. 13, and Fig. 16 is a diagrammatic representation of the refrogeration apparatus.

The vessels and conduits which make up the refrigeration system, together with the main and pilot burners and the automatic control mechanism, are housed in a cabinet which, with respect to general structural matters, may be of any approved construction. As illustrated in the accompanying drawings, the cabinet comprises a frame that is designated generally by the reference numeral 1, and a sheet metal covering 2 that is suitably connected to the frame. As I have occasion to refer to certain of the frame parts, I will designate them by the reference numeral 1, augmented by suitable exponents. Supported within the frame 1 and extending from its upper end to within a substantial distance of its lower end is a sheet metal lining 3 that encloses the refrigeration space 5. Between the sides of the previously mentioned sheet metal covering 2 and the adjacent walls of the lining 3 is a packing of insulating material 6, and the same extends beneath and to the rear of said lining where it is confined by a bottom wall 7 and a rear wall 8. An insulated door 9 closes the front of the refrigeration space.

Surmounting the cabinet (made up of the frame 1 and the sheet metal covering 2) is a tank 10 having an opening in its top that is closed by a cover 11. This tank constitutes a part of the condenser, as will hereinafter be explained. A dead air space 12 is formed between the walls 7 and 8 and a plate 13 that extends from the front of the cabinet rearwardly beneath the wall 7 and thence upwardly to the rear of the wall 8; and spaced a suitable distance from the plate 13 is one designated 14, and the space between these plates is open at its forward end and at its top and constitutes a flue through which a current of air may flow. By providing this ventilating flue and the dead air space 12, the refrigeration space is effectively protected from the heat generated by the burners and that radiating from the generator-absorber and the vapor delivery conduit that leads therefrom. Below the plate 14 is a compartment 16 that is closed at its front by a door 17 which affords ready access to the parts contained within said compartment. Supported within the rear of the compartment, and transversely thereof, as by brackets 17a (Fig. 1) that are attached to rear corner posts 1a of the frame 1, is a cylindrical vessel 18. Situated directly above the rear portion of the vessel 18 is a vapor drum 19 that is supported from and communicatively connected to said vessel by tubes 20. This assembly constitutes the generator-absorber.

A vapor delivery conduit 22 rises from the drum 19 to a point near the top of the tank 10 from where a portion of said conduit, designated 23, is inclined forwardly and upwardly through the rear wall of the tank and, adjacent the front of the tank, joins a gradually descending coil 24 which, with the tank 10, constitutes the condenser. A suitable cooling agent, such as water, occupies the tank 10 to a level above the coil 24, as indicated in the drawings. The portion of the delivery conduit designated 23 forms a dehydrator, as will be explained during the description of the operation of the apparatus.

Located within the upper part of the refrigeration space 5, and suspended from the top wall 25 of the cabinet, is the receiver-evaporator that is designated generally by the reference numeral 26. The same consists of a vessel 27 from one end of which depends a well 28, and extending from opposite sides of the lower end of said well are tubes 29 that are bent back and forth from front to rear and gradually ascend within a brine tank 30 to where they project upwardly through the top of said tank and open into the vessel 27 through the bottom wall thereof. Situated within the brine tank and opening through its forward end is a freezing chamber 31 about the opposite sides of which said tubes 29 extend. A metal casing 32 surrounds the vessel 27 and the space between it and the vessel is filled with insulating material 33.

A gas return conduit 35 leads upwardly and rearwardly from the rear top portion of the vessel 27 (Fig. 2) and then extends directly upwardly to nearly the height of the previously mentioned vapor delivery conduit 22 and thence laterally and downwardly to the rear of the vessel 18 where it enters said vessel at about the vertical center thereof, as best shown in Fig. 5. The lower extremity of said conduit is in the nature of an elbow which opens into the generator-absorber vessel 18 well below the minimum liquid level therein. A tube 36 leads forwardly from the conduit 35 through the front wall of the vessel 18 at about the elevation at which said conduit enters the vessel and connects at its outer end to one end of a double wall receptacle 37, the inner wall of which encloses a thermostat well 38. A tube 39 extends forwardly and downwardly from the opposite end of the double wall receptacle 37 and thence rearwardly beneath the right hand end of the generator-absorber vessel 18, as the parts are viewed from the front, and two tubes 40 extend from the tube 39 lengthwise of and beneath the vessel 18 to a point adjacent the opposite end thereof where they are turned upwardly and are communicatively connected to the vessel. It may be explained that the tubes 36 and 39 open into the space between the inner and outer walls of the receptacle 37, and it is evident from the foregoing description that a path of circulation is established by this arrangement upwardly through the elbow extremity of the gas return conduit 35, through the tube 36, through the space between the walls of the receptacle 37, and through the tubes 39 and 40, and the intervening portion of the vessel 18. This is diagrammatically illustrated very clearly in Fig. 16 in which view a baffle 41 is shown as extending from above the outlet end of the gas return conduit 35 to a point near the end of the vessel 18 into which the tubes 40 open. The baffle is also shown in full lines in Fig. 5 and in dotted lines in Fig. 4.

Returning now to the evaporator-receiver end of the system, it may be explained that the coil 24 of the condenser discharges through a pipe 45 into the vessel 27, said pipe entering the side of the gas return conduit 35 at the rear of the apparatus and then extending forwardly and downwardly through the portion of the conduit that joins the vessel 27 and terminating within the vessel adjacent the bottom thereof, as clearly shown in Figs. 1 and 2. The portion of the pipe 45 within the vessel 27 is shown as flattened.

A liquid return tube 46 leads upwardly from the bottom of the well 28 and through the vessel 27, leaving said vessel at a point adjacent the conduit 35 from where said tube 46 extends upwardly and laterally into close proximity to or in contact with the vapor delivery conduit 22 and thence downwardly to the rear of the generator-absorber, entering the vessel 18 thereof near the bottom, as shown particularly in Figs. 3 and 5. The upper part of the liquid return tube 46 is preferably welded to the adjacent portion of the vapor delivery conduit 22, as shown at 47 in Figs. 3 and 16. The purpose and mode of operation of the liquid return tube will presently be described.

Situated below and in operative relation to the generator-absorber is a gas burner 48, the same being shown as supported by brackets 49 and 50. This burner is of the usual type and the mixer through which the air and gas is admitted is designated 51.

The burner 48 will be referred to as the main burner to distinguish it from the pilot burner that will presently be described, and the gas supply to the main burner is controlled by a valve that is incorporated in control mechanism operated by a thermostat that is disposed within the thermostat well 38 of the previously mentioned double wall receptacle 37. As is usual with automatically operated valves for controlling the supply of gas to burners, the present valve is opened and closed with a snap action that is produced by mechanism under the control of the thermostat. This mechanism is illustrated in detail in Figs. 11 to 15, and it consists of a base 55 that is preferably cast of suitable metal and the same is formed with a rearward extension 56 containing a tapered bore 57 for the reception of the correspondingly tapered valve 58 that is provided with a diametrical passageway 59 adapted to be brought into and out of register with inlet and outlet ports 60 and 61, respectively, that are formed in the rearward extension 56. A stud shaft 62 extends rearwardly from the valve 58, and a washer 63 is held thereon by a cotter pin or the like 64, and a spring 65 is compressed between said washer and a washer 66 that is formed with a peripheral flange that bears against the adjacent part of the rearward extension 56. The spring 65 serves to retain the valve within the tapered bore 57 tightly enough to prevent leakage. A spindle 68 projects forwardly from the valve 58 and the same is formed with longitudinally spaced lateral arms 69 by and between which a pin 70 is carried.

The pin 70 reposes between and is adapted to be alternately engaged by the branches 71 and 72 of a forked lever 73 that is supported for oscillation upon a shaft 74 that extends through a boss 75 of the base 55, said shaft fitting tightly within said boss and projecting rearwardly thereof to form a stop designated 76, the purpose of which will presently appear. A cotter pin 77 holds the forked lever 73 against withdrawal from the shaft 74. The end of the lever 73 opposite its forked end is in the form of a rectangular frame (Fig. 13) by and between the side members of which is supported a pin 78. This end of the lever is adapted to swing between stops 80 and 81 (Figs. 11 and 12) that are formed integral with and project forwardly from the base 55. The lower end of the lever 73 is tapered to provide a knife edged bearing 82 with which a cupped spring seat 83 engages and on which it is adapted to rock, the spring seat being held against displacement with respect to the adjacent end of the lever by a pin 84 that extends from the lever through a central aperture in the spring seat. A spring 85 is compressed between the seat 83 and a seat 86 having a conical recess that bears upon the tapered end 87 of a screw 88 that is threaded through a lug 89 of the base 55 and is adapted to be secured in any position to which it is adjusted by a lock nut 90, this screw obviously serving as a means for adjusting the tension of the spring 85.

Pivoted upon a pin 92 that projects forwardly from the upper end of the base 55 is a curved lever 93 whose lower end is formed with opposed parts 94 and 95 that are connected together by a laterally offset portion 96. Screwed through tapped holes in the parts 94 and 95 are the threaded shanks of buttons 98 and 99 that are disposed on opposite sides of the pin 78 that is carried by the lower end of the lever 73. Lock nuts 100 secure the buttons in their positions of adjustment. As best shown in Fig. 14, a grooved roller 101 is supported within a bifurcation in the rear end of the laterally extended part 96 of the lever 93, and one end of a spring 102 bears against said roller while the opposite end of the spring engages a lug 103 on the base 55. Intermediate its ends the spring is coiled about a post 104 that projects forwardly from the lower right hand corner of the base, as the same is viewed from the front. This spring 102 tends to force the lever 93 in a direction to engage the button 99 with the pin 78 of the lever 73 and swing the lower end of said lever forwardly against the initial action of the spring 85 into engagement with the stop 80, during which movement of the lever the branch 71 of its forked upper end engages the pin 70 and turns the valve 58 to a position in which its passageway 59 registers with the ports 60 and 61. In other words, it opens the valve. The parts are shown in Fig. 11 in the positions they occupy when the valve is open; and they are shifted to close the valve to the positions illustrated in Fig. 12 by the thermostat which I will now describe.

Guided through a hollow boss 105 that is shown as formed integral with the base 55 near the upper right hand corner thereof, as the parts are viewed in Figs. 11 and 12, is a rod 106 that extends through a hole 107 in the lever 93 immediately below the pin 92 on which the lever is pivoted. The side of the lever opposite the boss 105 and in the zone of the rod 106 is notched for the reception of knife edge bearing portions of a member 108 that is applied to the rod and is prevented from turning with respect thereto by a spring member 109 that is formed to embrace said member. The spring member has an aperture through which the rod 106 extends and it may be explained that said member is also provided with a tongue 110 that is received by a groove 111 in the side of the rod (see Figs. 12 and 13). The end portion of the rod is threaded and applied thereto is a nut 112 by means of which the member 108 may be adjusted longitudinally of the rod. The nut 112 has a series of teeth 113 extending circumferentially about it which are adapted to enter an opening in the underlying portion of the spring member 109, thereby to lock the nut against turning. To adjust the nut on the rod it is only necessary to depress the end of the spring member out of engagement with the teeth 113 when the nut may be turned without interference by said spring, and after the adjustment is made the spring is released to again engage the teeth of the nut.

The rod 106 extends through a tube 115 of suitable metal that readily expands and contracts under temperature changes. One end of said tube engages the boss 105 while its opposite end is engaged by a head 116 on the rod 106 (see Fig. 8). The tube 115, with the rod 106 therein occupies the thermostat well 38 in the double wall receptacle 37. The operating parts of the valve control mechanism above described are enclosed in a casing 117 that is applied to the base 55 and is held thereto by a screw 118 that is threaded into the end of the post 104 about which the spring 102 is coiled.

From the above description of the thermostatic valve-operating mechanism, its mode of operation will be apparent. The lever 73 and the spring 85 constitute, in effect, a toggle joint, and the swinging of the lever 93 moves the toggle joint between its extreme positions which are determined by the engagement of the lower end of the lever 73 with the stops 80 and 81.

As previously explained, the valve 58 and associated parts are in the positions shown in Fig. 11 when the valve is open; and the parts are shifted to the positions in which the valve is closed by a heating up of the thermostat, as will now be explained. When the temperature of the contents of the receptacle 37 rises to a predetermined high degree it expands the tube 115, causing it to move the rod 106 to the right (as the parts are viewed in Figs. 11 and 12). This movement of the rod is transmitted to the lever 93 through the intervention of the nut 112 and the member 108. When the lever 93 swings to the right, the button 98 that is carried by the part 94 of said lever engages the pin 78 on the lever 73 and swings the last mentioned lever beyond a position in which it and the spring 85 are in axial alignment—that is to say, swings the toggle joint comprising the lever 73 and spring 85, beyond "dead center". As soon as this occurs, the spring 85 expands and quickly snaps the lower end of the lever 73 over against the stop 81. During this action of the lever the branch 72 of its forked upper end engages the pin 70 on the valve spindle and swings it to the left far enough to close the valve.

When the temperature affecting the tube 115 drops sufficiently to permit the tube to contract to its former length the rod 106 will be relaxed allowing the parts to be swung to the position in which they are shown in Fig. 11 by the spring 102.

There are circumstances under which it is desirable to manually open the valve 58, and by manually operated means to retain the valve in its closed condition. Provisions for doing so are supplied in the form of a shaft 120 that is journaled in a bore extending through the base 55 adjacent the valve 58, a member 121 that is secured to the forward end of the shaft, and a handle 122 that is fastened to the rear end of the shaft. The member 121 includes a forwardly directed lug 123 that is adapted to contact with the branch 71 of the forked end of the lever 73 when the member is swung to the right, and a rearwardly directed lug 124 that is arranged to engage an arm 125, that extends laterally from the valve spindle 68, when the member is swung upwardly. The member is retained in normal position, as shown, by a spring 125 that is arranged to contact with the handle 122. This spring, as illustrated in Figs. 8 and 13 particularly, has its lower end fixed to the base 55 while its upper end is turned laterally and then rearwardly into the path of the handle 122. The previously mentioned stop 76 that is formed by the rear end of the shaft 74 limits the movement of the spring in the direction of the handle 122. When it is desired to manually shift the parts from the positions in which they are illustrated in Fig. 12, with the valve 58 closed, to those occupied by them in Fig. 11, thereby to open the valve, the handle 122 is swung from the position shown in full lines in Figs. 8 and 15 downwardly to a vertical position against the action of the spring 125. This reverses the position of the lever 73 and opens the valve and, when the handle 122 is released, the spring 125 returns it, and the parts connected to it including the member 121, to normal position. In order to close the valve and hold it in closed condition, the handle 122 is swung to the high position illustrated in broken lines in Figs. 8 and 15, such action of the handle swinging the member 121 upwardly to engage its lug 124 with the arm 125 and lift said arm to the position shown in Fig. 12 and hold it there against accidental dislodgment.

Welded or otherwise secured to the end of the receptacle 37 opposite that beyond which the above described thermostatic valve operating mechanism is situated, is a support 130 to which is attached, as by screws 131, a safety valve that is designated generally by the reference numeral 132. The casing 133 of this valve has an inlet chamber 134 and an outlet chamber 135 that communicate through a passageway 136 surrounded by a valve seat 137. A diaphragm 138 closes the open side of the outlet chamber 135 and has secured to it, by a member 139, a valve 140 for cooperation with the seat 137. The valve is urged against the seat by a spring 141 that is compressed between the valve and a cap 142 that closes the open side of the inlet chamber 134. A gas supply pipe 143 leads to the inlet chamber 134, and a conduit 144 leads from the outlet chamber 135 to the inlet port 60 formed in the rearward extension 56 of the base 55. The outlet port 61 in said extension is connected by a conduit 145 with the mixer 51 of the main burner 48.

Extending lengthwise of and beneath the receptacle 37 is a heating chamber 146 from the end of which remote from the safety valve 132 depends a casing 147 enclosing a pilot burner 148. The products of combustion from this burner pass substantially throughout the length of the chamber 46 and escape therefrom through a flue 149 (Figs. 4, 5 and 6) to the rear of the structure where they finally enter one of the flues later to be described. As shown in Figs. 4 and 6, what may be termed a communicator 150 extends from an opening 151 in the rear side, and near the top, of the pilot burner casing 147 to the main burner, the purpose of which is to conduct gas, escaping from the main burner when the valve controlling the latter is open, upwardly to the flame of the pilot burner and which, upon being ignited, flashes back and lights the main burner. Gas is supplied to the pilot burner through a conduit 153 (Figs. 1, 6 and 8) that includes a standard pressure regulator shown conventionally at 154. Interposed between an adjusting screw 155, that is threaded through a block 156 in the end of the heating chamber 146 opposite the safety valve, and the member 139, that is carried by the diaphragm 138, is a thermostatic rod 157. As long as the pilot burner is in operation, the heat of its products will maintain the rod 157 expanded thereby to hold the valve 140 off the seat 137 against the action of the spring 141 and permit gas to flow from the supply pipe 143 through the safety valve and conduit 144 to the valve 58 and, when said valve is opened, on to the main burner. It is evident from this that upon the pilot light being extinguished, the rod 157 will contract and allow the spring 141 to close the safety valve. It is important, also, that the receptacle 37 be exposed to the heat generated by the pilot light, as will hereinafter more fully appear.

The sheet metal construction at the rear of the apparatus provides two upwardly converging flues 160 that open at their lower ends into the compartment 16 and at their upper ends rearwardly of the tank 10. The construction by which these flues are formed is illustrated in perspective in Fig. 7; and by reason of the shape of the flues, an upwardly diverging space 161 is provided between them for the accommodation of the vapor delivery conduit 22, the gas return conduit 35, and the liquid return tube 46.

The system including the generator-absorber, the evaporator-receiver and the conduits and tubes through which they communicate is hermetically sealed and contains a quantity of suitable refrigerant, which may consist of ammonia, and an absorbent therefor, which may be water, in proper proportions. At the beginning of a cycle of operation, practically all of the mixture, known as liquor, is present in the vessel 18, the same standing at about the level indicated by the dotted line a in Figs. 2, 5 and 16. This being considerably above the elevation of the receptacle 37, said receptacle, and the tubes through which it is connected with the vessel 18, will be filled with the liquor.

In describing the operation of the apparatus, it will be assumed that a cycle has just been initiated by the ignition of the main burner 48. As a prerequisite to this, the pilot light must have been in operation in order to expand the thermostatic rod 157 thereby to hold the safety valve open, as well as to ignite the gas issuing from the main burner as a result of the opening of the valve 58. The products of combustion rising from the main burner about the tubes 40 and the vessel 18 causes the contents thereof to boil and a circulation to be set up through the tubes 40 toward the generator and through the intervening portion of the generator to the open end of the gas return conduit 35 and through the adjacent portion of said conduit to the tube 36 which leads to the space between the walls of the receptacle 37, the flow continuing through said space and the tube 39 that leads to the tubes 40.

The vapors resulting from the boiling of the liquor in the vessel 18 pass through the tubes 20 to the vapor drum 19 and thence through the delivery conduit 22 to the dehydrator 23. Here most, if not all, of the absorbent vapors condense and flow back through the conduit 22, drum 19 and tubes 20 to the vessel 18, while the refrigerant vapors, and possibly a small quantity of the absorbent vapors, pass into the coil 24 where they are condensed and from which they escape through the tube 45 to the vessel 27. At this point it may be explained that the purpose of the vapor drum 19 is to prevent the boiling liquid in the generator-absorber from gaining access to the vapor delivery tube 22. This occasionally happens where the delivery tube leads directly from the liquid containing vessel of the generator-absorber and interferes spasmodically with the flow of vapor through the conduit.

That phase of the cycle of operation during which the main burner is operating and the refrigerant is being distilled over into the receiver-evaporator is known as the heating-condensing period, and during the early part of said period, when the pressure in the system is rising rapidly, any absorbent condensate, which was left in the bottom of the receiver-evaporator at the conclusion of the previous cooling-evaporating period is transferred through the tube 46 to the generator-absorber. The manner in which this liquid transfer device functions is clearly brought out in United States Letters Patent No. 1,816,975, dated August 4, 1931. To insure against the return of any appreciable quantity of anhydrous refrigerant from the receiver-evaporator during the liquid transfer, I connect the high portion of the liquid return tube to an adjacent part of the vapor delivery tube so as to enhance the heat interchange between the parts in this region, the same being accomplished in the present instance by welding the tube 46 to the conduit 22 as indicated at 47. The heat conducted to the liquid return tube causes any anhydrous refrigerant that attempts to pass through the tube to flash into gas which breaks the siphonic action that is responsible for the liquid transfer.

The heating-condensing period continues until the valve 58 is closed by the action of the thermostat in the well 38 of the receptacle 37. The thermostatic mechanism, with respect to the temperature affecting it, is adjusted to close the valve when a quantity of refrigerant has been distilled over into the receiver-evaporator such as will establish a liquid level in the vessel 27 to approximately that indicated by the dotted line b in Figs. 1, 2 and 16.

The temperature of the liquid in the vessel 18 of the generator-absorber rises gradually during the heating-condensing period and during all of this time it is being circulated in the manner above described through the receptacle 37. Finally it becomes sufficiently hot to cause the expansion of the tube 115 necessary to operate the valve actuating mechanism and shift it to the position shown in Fig. 12 in which the valve 58 is closed and therefore the supply of gas to the main burner is shut off. Immediately upon the cessation of heat the pressure in the system starts to fall and the anhydrous refrigerant in the receiver-evaporator begins to vaporize and pass back in the form of gas through the gas return conduit 35 to the generator-absorber. The pressure in the vessel 27 and conduit 35 is sufficiently high to displace practically all liquid from the portion of the gas return conduit within the vessel 18 and from the tube 36 and receptacle 37. The gas returning through the conduit 35 escapes into the vessel 18 below the baffle 41 and is absorbed by the relatively weak liquor in that vessel, and during this time the gas that is in the receptacle 37 is maintained at a relatively high temperature by the heat from the pilot burner that is continually passing through the chamber 146.

The condition just described continues as long as the tube 45 is liquid-sealed in the vessel 27, or, in other words, until the anhydrous refrigerant is evaporated from the receiver-evaporator in sufficient quantity to lower the liquid level below the end of the tube 45. As soon as this occurs the pressure throughout the system substantially equalizes whereupon the bodies of liquid in the vessel 18 and in the receptacle 37 tend to seek a common level. In the attainment of this, liquid rushes from the vessel 18 through the tubes 40 and 39 to the receptacle 37, flooding such receptacle, so to speak, with the liquid in the generator-absorber end of the system which has now become relatively cool. This inrush of cool liqiud lowers the temperature affecting the thermostatic tube 115, causing said tube to contract thereby to allow rod 106 to move to the left, as the parts are viewed in Figs. 11 and 12, and permitting the spring 102 to reverse the positions of the valve actuating parts thereby to open the valve and again supply gas to the main burner 48 which is promptly ignited from the pilot burner by virtue of the communicator 150.

While I have provided a valve 165 in the gas supply pipe 143 for shutting off the gas completely from the entire apparatus, there may be occasions when it is desirable to suspend action of the refrigeration apparatus without shutting off the pilot burner. This may be accomplished by lifting the handle 122 and swinging the member 121 upwardly so that the lug 124 thereof will engage and lift the arm 125 and turn the valve 58 to closed position. The parts may be locked in this position by leaving the handle elevated. Again, it may be desirable at times to start the apparatus in operation after the valve 58 has been closed for some time, and this may be done by swinging the handle downwardly to vertical position against the action of the spring 125 which swings the member 121 in a direction to engage its lug 123 with the adjacent part of the lever 73 and move the upper end of the lever in a corresponding direction to cause it to open the valve 58.

Having thus described my invention, what I claim is:

1. In absorption refrigeration apparatus, means for heating the generator-absorber, thermostatic means for controlling said heating means, a receptacle in communication with the generator-absorber end of the refrigeration system and adapted to be flooded with liquid therefrom, said thermostatic means being in heat exchanging relation to the contents of said receptacle, and connections whereby the liquid contents of said receptacle, are displaced by refrigerant gas returning from the receiver-evaporator end of the system to the generator-absorber end thereof.

2. In absorption refrigeration apparatus comprising an intercommunicating system involving a generator-absorber and a receiver-evaporator, means for heating the generator-absorber, thermostatic means for controlling said heating means, a receptacle communicating with the system and into which liquid from the generator-absorber is adapted to flow, said thermostatic means being arranged in heat exchanging relation to said receptacle, and connections through which the refrigerant gas returning from the receiver-evaporator to the generator-absorber displaces the liquid from said receptacle so long as the pressure in the receiver-evaporator end of the system is superior to that in the generator-absorber end.

3. In absorption refrigeration apparatus comprising an intercommunicating system involving a generator-absorber and a receiver-evaporator, means for heating the generator-absorber, thermostatic means for controlling said heating means, a receptacle communicating with the system and into which liquid from the generator-absorber is adapted to flow, said thermostatic means being arranged in heat exchanging relation to said receptacle, means for heating the receptacle, and connections through which the refrigerant gas returning from the receiver-evaporator to the generator-absorber displaces the liquid from said receptacle so long as the pressure in the receiver-evaporator end of the system is superior to that in the generator-absorber end.

4. In absorption refrigeration apparatus involving a generator-absorber and a receiver-evaporator, means for heating the generator-absorber, control mechanism for rendering the heating means effective to inaugurate a so-called heating period and to render it ineffective to inaugurate a so-called cooling period, means for conducting refrigerant from the generator-absorber and delivering it to the receiver-evaporator during the heating period, said means being liquid sealed in the receiver-evaporator when there is an appreciable quantity of liquid therein, means for returning the refrigerant in gaseous form from the receiver-evaporator to the generator-absorber during the cooling period, a receptacle in communication with the generator-absorber through a part of said refrigerant return means and from which liquid is displaced during the cooling period by the refrigerant gas until the pressure thereof is reduced by an equalization of the pressure throughout the system due to the unsealing of the refrigerant conducting and deliverying means in the receiver-evaporator, and thermostatic means subjected to the temperature of the liquid in said receptacle for actuating said control mechanism.

5. In absorption refrigeration apparatus involving a generator-absorber and a receiver-evaporator, means for heating the generator-absorber, control mechanism for rendering the heating means effective to inaugurate a so-called heating period and to render it ineffective to inaugurate a so-called coolin', period, means for conducting refrigerant from the generator-absorber and delivering it to the receiver-evaporator during the heating period, said means being liquid sealed in the receiver-evaporator when there is an appreciable quantity of liquid therein, means for returning the refrigerant in gaseous form from the receiver-evaporator to the generator-absorber during the cooling period, a receptacle in circulation with the generator-absorber through a part of said refrigerant return means and from which liquid is displaced during the cooling period by reason of the higher pressure in the receiver-evaporator end of the system until the pressure throughout the system is substantially equalized by the unsealing of the refrigerant conducting and delivery means in the receiver-evaporator, and thermostatic means subjected to the temperature of the liquid in said receptacle for actuating said control mechanism.

6. In absorption refrigeration apparatus involving a generator-absorber and a receiver-evaporator, means for heating the generator-absorber control means for rendering the heating means effective to inaugurate a so-called heating period and to render it ineffective to inaugurate a so-called cooling period, means for conducting refrigerant from the generator-absorber and delivering it to the receiver-evaporator during the heating period, said means being liquid sealed in the receiver-evaporator when there is an appreciable quantity of liquid therein, means for returning the refrigerant in gaseous form from the receiver-evaporator to the generator-absorber during the cooling period, a receptacle communicating with the refrigerant return means in the vicinity of the generator-absorber and into which liquid from the generator-absorber is adapted to flow, liquid conducting means extending from said receptacle in heat receiving relation to the heating means and communicating with the generator-absorber, means for heating the receptacle, and thermostatic means for actuating the aforesaid control mechanism and arranged in heat exchanging relation to said receptacle.

7. In absorption refrigeration apparatus involving a generator-absorber and a receiver-evaporator, means for heating the generator-absorber, control means for rendering the heating means effective to inaugurate a so-called heating period and to render it ineffective to inaugurate a so-called cooling period, means for conducting refrigerant from the generator-absorber and delivering it to the receiver-evaporator during the heating period, said means being liquid sealed in the receiver evaporator when there is an appreciable quantity of liquid therein, means for returning the refrigerant in gaseous form from the receiver-evaporator to the generator-absorber during the cooling period, a receptacle communicating with the refrigerant return means in the vicinity of the generator-absorber and into which liquid from the generator absorber is adapted to flow, liquid conducting means extending from said receptacle in heat receiving relation to the heating means and communicating with the generator-absorber, and thermostatic means for actuating the aforesaid control mechanism and arranged in heat exchanging relation to said receptacle.

8. In absorption refrigeration apparatus involving a generator-absorber and a receiver-evaporator, a fluid fuel combustion device for heating the generator-absorber, control mechanism for governing the supply of fuel to said device, means for conducting refrigerant from the generator-absorber and delivering it to the receiver-evaporator, said means being liquid sealed in the receiver-evaporator when there is an appreciable quantity of liquid therein, means for returning the refrigerant in gaseous form from the receiver-evaporator to the generator-absorber, a receptacle in circulation with the generator-absorber and in communication with the refrigerant return means, the refrigerant gas serving by reason of the superior pressure in the receiver-evaporator end of the system to displace liquid from said receptacle until the refrigerant conducting and delivery means is unsealed in the receiver-evaporator thereby to substantially equalize the pressure throughout the system, and thermostatic means subjected to the temperature of the liquid in said receptacle for actuating the aforesaid control mechanism.

9. In absorption refrigeration apparatus involving a generator-absorber and a receiver-evaporator, a fluid fuel combustion device for heating the generator-absorber, control mechanism for governing the supply of fuel to said device, means for conducting refrigerant from the generator-absorber and delivering it to the receiver-evaporator, said means being liquid sealed in the receiver-evaporator when there is an appreciable quantity of liquid therein, means for returning the refrigerant in gaseous form from the receiver-evaporator to the generator-absorber, a receptacle in circulation with the generator-absorber and in communication with the refrigerant return means, the refrigerant gas serving by reason of the superior pressure in the receiver-evaporator end of the system to displace liquid from said receptacle until the refrigerant conducting and delivery means is unsealed in the receiver-evaporator thereby to substantially equalize the pressure throughout the system, thermostatic means subjected to the temperature of the liquid in said receptacle for actuating the aforesaid control mechanism, and a pilot burner disposed in heating relation to said receptacle and in lighting relation to the aforesaid combustion device.

10. In absorption refrigeration apparatus involving a generator-absorber and a receiver-evaporator, a fluid fuel combustion device for heating the generator-absorber, control mechanism for governing the supply of fuel to said device, means for conducting refrigerant from the generator-absorber and delivering it to the receiver-evaporator, said means being liquid sealed in the receiver-evaporator when there is an appreciable quantity of liquid therein, means for returning the refrigerant in gaseous form from the receiver-evaporator to the generator-absorber, a receptacle in circulation with the generator-absorber and in communication with the refrigerant return means, the refrigerant gas serving by reason of the superior pressure in the receiver-evaporator end of the system to displace liquid from said receptacle until the refrigerant conducting and delivery means is unsealed in the receiver-evaporator thereby to substantially equalize the pressure throughout the system, thermostatic means subjected to the temperature of the liquid in said receptacle for actuating the aforesaid control mechanism, a pilot burner disposed in heating relation to said receptacle and in lighting relation to the aforesaid combustion device, a safety valve biased toward closed position for controlling the supply of fuel to the combustion device, and thermostatic means subjected to the heat generated by the pilot burner for maintaining the safety valve open.

11. In an absorption refrigerating machine, means for heating the generator-absorber, a receptacle in communication with the generator-absorber and adapted to be flooded with liquid therefrom, a gas return conduit leading from the receiver-evaporator to said receptacle whereby to clear the receptacle of liquid during the evaporation period, and a thermostat in heat exchanging relation to said receptacle for controlling the heating means.

12. In an absorption refrigerating machine, means for heating the generator-absorber, a receptacle in circulation with the generator-absorber and adapted to be flooded with liquid therefrom, an auxiliary heater for said receptacle, a gas return conduit leading from the receiver-evaporator to said receptacle whereby to clear the latter of liquid during the evaporation period, and a thermostat in heat exchanging relation to said receptacle for controlling the first mentioned heating means.

13. In an absorption refrigerating machine, a combustion device for heating the generator-absorber, a receptacle in circulation with the generator-absorber and adapted to be flooded with liquid therefrom, a pilot burner for lighting the combustion device and arranged in heating relation to said receptacle, a gas return conduit leading from the receiver-evaporator to said receptacle whereby to clear the latter of liquid during the evaporation period, and a thermostat in heat exchanging relation to said receptacle for controlling the combustion device.

14. In an absorption refrigerating machine, means for heating the generator-absorber, a receptacle in circulation with the generator-absorber and adapted to be flooded with liquid therefrom, a gas return conduit leading from the receiver-evaporator to said receptacle whereby to clear the receptacle of liquid during the evaporation period, a well in said receptacle, and a thermostat in said well for controlling said heating means.

15. An absorption refrigerating machine comprising a cabinet enclosing an insulated refrigeration space and a compartment therebelow and laterally spaced flues rising from said compartment rearwardly of the refrigeration space, spaced apart plates enclosing between them an air space separating said compartment and the flues from the refrigeration space, a refrigeration system including a generator-absorber, a receiver-evaporator, and conduits connecting them, said system being arranged with the generator-absorber in said compartment and with the receiver-evaporator in heat exchanging relation to the refrigeration space, while said conduits are disposed within the space between the flues, and means for heating the generator-absorber.

16. An absorption refrigerating machine comprising a cabinet enclosing an insulated refrigeration space and a compartment therebelow and laterally spaced flues rising from said compartment rearwardly of the refrigeration space, plates enclosing between them an air space and separating the refrigeration space from the compartment and flues, an absorption refrigerating system supported by the cabinet and including a generator-absorber situated within the aforesaid compartment, a receiver-evaporator in heat exchanging relation to the refrigeration space and a condenser surmounting the cabinet and conduits through which the generator-absorber, condenser and receiver-evaporator communicate, said conduits being accommodated by the space between the flues, and heating means for the generator-absorber located in said compartment.

17. An absorption refrigerating machine comprising a cabinet enclosing an insulated refrigeration space and a compartment therebelow and laterally spaced flues rising from said compartment to the rear of said space, an absorption refrigeration system supported by the cabinet with the generator-absorber in the aforesaid compartment and with the receiver-evaporator in heat exchanging relation to the refrigeration space, while the conduits connecting the generator-absorber and the receiver-evaporator are disposed within the space between the aforesaid flues, and heating means located in operative relation to the generator-absorber.

WILBUR G. MIDNIGHT.